United States Patent [19]

Chan et al.

[11] Patent Number: 4,722,047
[45] Date of Patent: Jan. 26, 1988

[54] PREFETCH CIRCUIT AND ASSOCIATED METHOD FOR OPERATION WITH A VIRTUAL COMMAND EMULATOR

[75] Inventors: Kasun K. Chan, Del Mar; Truc D. Y. Nguyen, San Diego; Chiman R. Patel, Escondido, all of Calif.

[73] Assignee: NCR Corporation, Dayton, Ohio

[21] Appl. No.: 770,459

[22] Filed: Aug. 29, 1985

[51] Int. Cl.⁴ .......................................... G06F 12/08
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,618,041 | 11/1971 | Horikoshi | 364/200 |
| 3,768,080 | 10/1973 | Boger et al. | 364/200 |
| 4,218,743 | 8/1980 | Hoffman et al. | 364/200 |
| 4,371,924 | 2/1983 | Schaefer et al. | 364/200 |
| 4,422,144 | 12/1983 | Johnson et al. | 364/200 |
| 4,502,110 | 2/1985 | Saito | 364/200 |

Primary Examiner—Gary V. Harkcom
Assistant Examiner—David L. Clark
Attorney, Agent, or Firm—Wilbert Hawk, Jr.; Edward Dugas; Floyd A. Gonzalez

[57] ABSTRACT

A prefetch circuit for use with a memory including a storage register for receiving a command from the memory, a decoding circuit for decoding the command to determine the identification of an index register contained within the command, and a fetch circuit for fetching the contents of the index register from the command. The prefetch circuit also includes a virtual address storage register for receiving and storing the virtual address of the command, an adding circuit for adding a predetermined offset to the virtual address of the command to obtain a new virtual address, a comparison circuit for determining if the new virtual address from the adding circuit has crossed a virtual page boundary, a transfer circuit responsive to the comparison circuit for transferring the real address in the real address storage register to the adding circuit for adding the offset thereto, thereby obtaining a new real address. The fetch circuit then fetches a prefetched command from the memory at the new real address. Data registers are also included for prefetching data.

12 Claims, 12 Drawing Figures

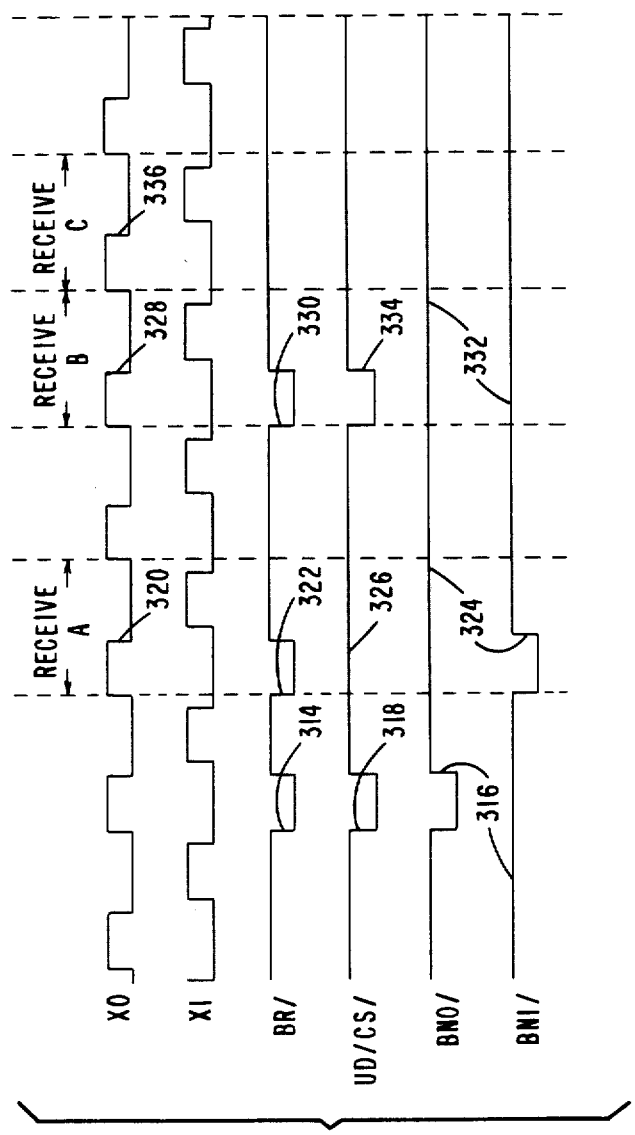

PREFETCH CIRCUIT AND ASSOCIATED METHOD FOR OPERATION WITH A VIRTUAL COMMAND EMULATOR

BACKGROUND OF THE INVENTION

The present invention is related to general purpose digital computer systems, and is more particularly related to a prefetch circuit and associated method for operation with a virtual command emulator.

With the advent of microprocessor based integrated circuit chips, many data processing tasks have been assigned to these chips which were previously done by the central processor of a computer system. Microprocessor emulator chips have been developed which include on-chip microcode programs for emulating mainframe instruction sets. In order to emulate a mainframe instruction, the emulator must fetch a command from the memory of the computer system, decode the command into its object instruction code and index registers, as appropriate, and fetch the contents of the index registers before the command is emulated. It will thus be understood that significant time must be spent fetching data from memory before the emulator may begin emulating a mainframe instruction.

U.S. Pat. No. 4,514,803 issued Apr. 30, 1985 to Agnew et al. for "Methods For Partitioning Mainframe Instruction Sets to Implement Microprocessor Based Emulation Thereof" discloses methods of emulating mainframe instruction sets with microprocessor based integrated circuit chips.

U.S. Pat. No. 3,723,976 issued Mar. 27, 1973 to Alvarez et al. for "Memory System with Logical and Real Addressing" discloses a memory system including a cache buffer and means for translating logical addresses to real addresses.

U.S. Pat. No. 4,084,230 issued Apr. 11, 1978 to Matick for "Hybrid Semiconductor Memory with On-Chip Associative Page Addressing, Page Replacement and Control" discloses a means for translating virtual page addresses to real addresses.

U.S. application Ser. No. 643,512 filed Aug. 23, 1984 by Schmidt et al. for "Direct Execution of Software on Microprogrammable Hardware" and owned by the assignee of the present invention, discloses a prefetch circuit which prefetches from a memory location which is a designated number of words displaced from the memory location of the last fetch, and which prevents the attempted crossing of a virtual page boundary during a prefetch operation.

SUMMARY OF THE INVENTION

In a specific embodiment, a prefetch circuit is disclosed for use with a memory, and includes a storage register for receiving a command from the memory, a decoding circuit for decoding the command to determine the identification of an index register contained within the command, and a fetch circuit for fetching the contents of the index register from the command. The prefetch circuit also includes a virtual address storage register for receiving and storing the virtual address of the command, an adding circuit for adding a predetermined offset to the virtual address of the command to obtain a new virtual address, a comparison circuit for determining if the new virtual address from the adding circuit has crossed a virtual page boundary, a transfer circuit responsive to the comparison circuit for transferring the real address in the real address storage register to the adding circuit for adding the offset thereto, thereby obtaining a new real address. The fetch circuit then fetches a prefetched command from the memory at the new real address.

It is thus an object of the invention to provide a prefetch circuit which prefetches either commands or data for use by a processor, wherein the prefetch unit has registers designated for the receipt of commands or data.

It is another object of the invention to provide a prefetch unit which is instructed to prefetch from adjacent memory locations in a memory which are either immediately above or immediately below the last memory location fetched.

It is another object of the invention to provide a prefetch unit which, when it prefetches a command, decodes the command and prefetches the contents of an index register which is identified in the command.

It is another object of the invention to provide a prefetch unit which provides for crossing page boundaries in a prefetch operation.

These and other objects of the present invention will become apparent from the drawings and preferred embodiment disclosed herein.

BRIEF DESCRIPTION OF THE DRAWINGS

FIG. 11 is a timing diagram of various signals during a series of consecutive receive operations of the prefetch circuit of FIGS. 9A and 9B.

DESCRIPTION OF THE PREFERRED EMBODIMENT

Figure 1:
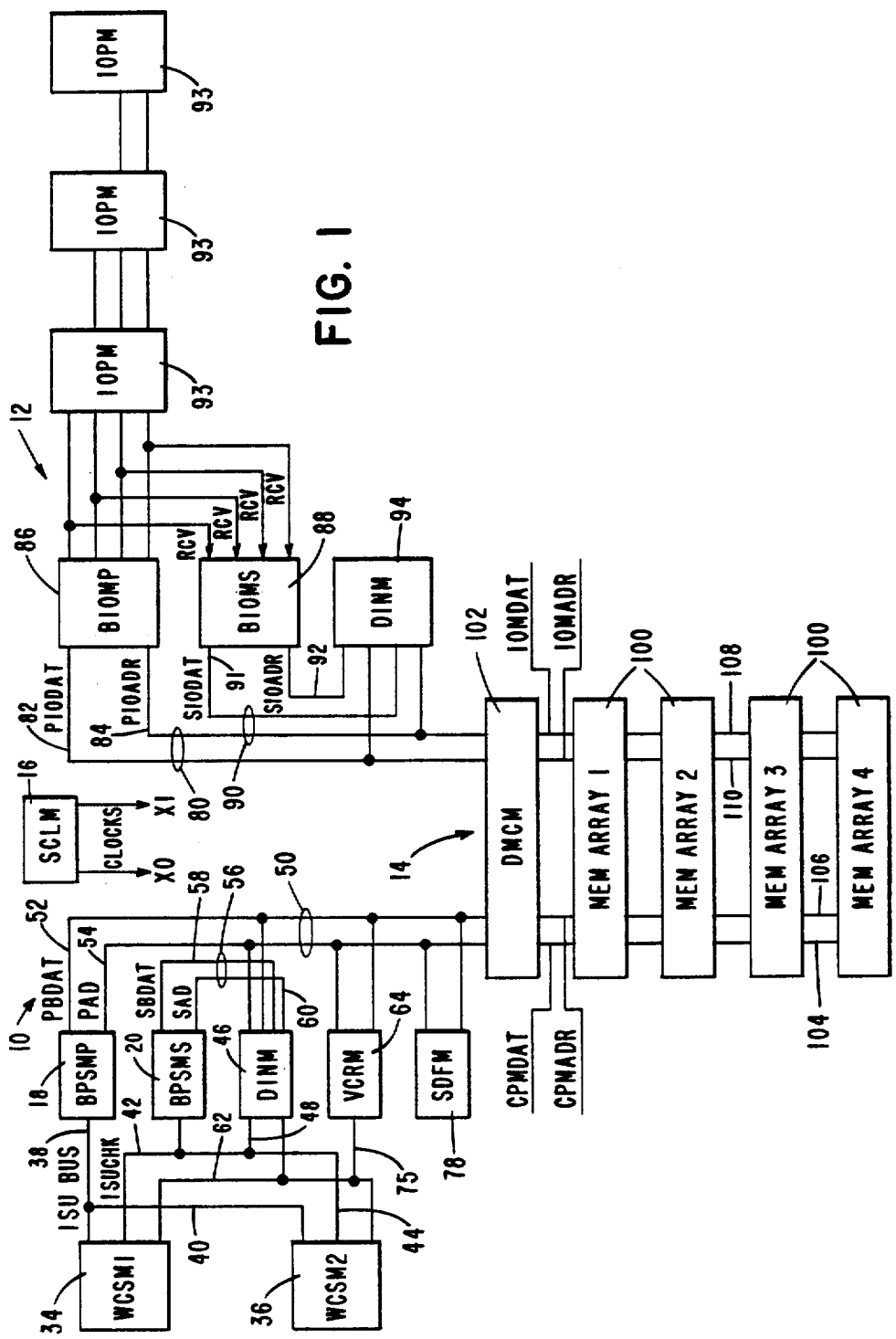
FIG. 1 is a block diagram of a general purpose data processing system usable with the present invention.

FIG. 1 is a block diagram of a general purpose data processing system including the present invention, and includes a virtual command processor subsystem 10, an input/output (I/O) subsystem 12, and a memory subsystem 14. The subsystems 10, 12 and 14 are further divided into modules, with certain modules being duplicated to provide data integrity and command retrying capabilities of the data processing system, as will be explained. A system clock module (SCLM) 16 is provided. The principal timing of the disclosed system is maintained through the use of a two-phase clock having an X0 output and an X1 output, which are derived from a single crystal oscillator, not shown. The system bus clock, not shown, is also included in the SCLM module 16. The generation of clock signals and their distribution and utilization is well understood in the art and will not be discussed further.

The virtual command processor subsystem 10 includes a pair of basic processor subsystem modules (BPSM) 18 and 20, one, 18, being the primary module (BPSMP) and the other, 20, being the secondary module (BPSMS). Each of the modules 18 and 20 include very large scale integration circuit (VLSI) chips from the NCR 32 bit chip set, as explained in the NCR/32 General Information Publication available from VLSI Processor Products, NCR Microelectronics Division, Colorado Springs, Colo., under the Stock No. ST-2104-23.

Figure 2:
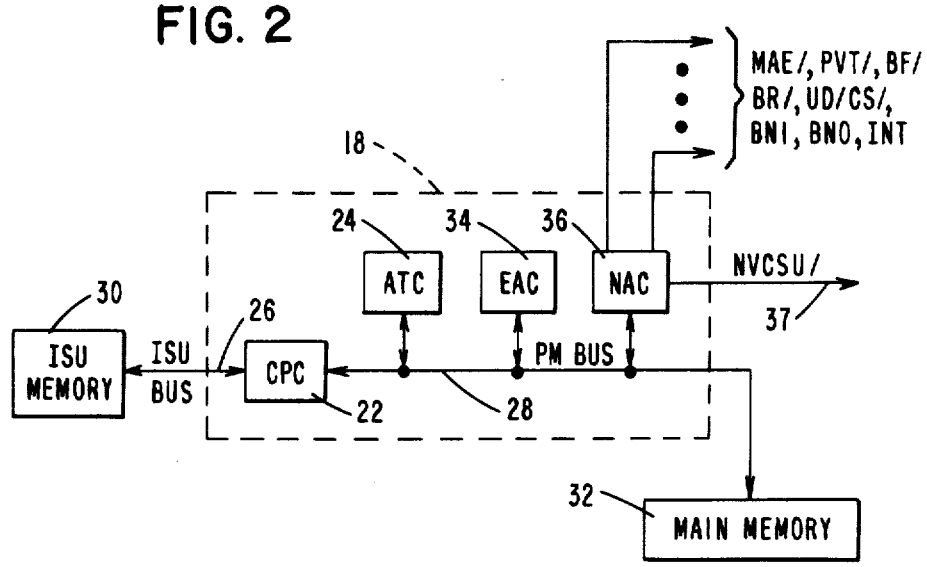
FIG. 2 is a block diagram showing one of the basic processor subsystem modules of FIG. 1.

Referring to FIG. 2, each of the BPSM modules 18 and 20 may include a central processor chip (CPC) 22 and an address translation chip (ATC) 24, as fully explained in the mentioned NCR/32 General Information Publication. The CPC 22 is connected to an instruction storage unit (ISU) bus 26 and a processor-memory (PM) bus 28. As is known, the CPC 22 places instruction addresses on the ISU bus 26 in response to the clock signal X0 from SCLM 16, directed to an ISU memory 30, and receives instructions back from the ISU memory 30 in response to the clock signal X1 from SCLM 16. Addresses for memory operations are also placed on the address portion of the PM bus 28, and data is either fetched from or written into a main memory 32 at the given address. It will be understood that in the system of FIG. 1, the memory subsystem 14 includes the main memory 32 of FIG. 2.

Figure 3:
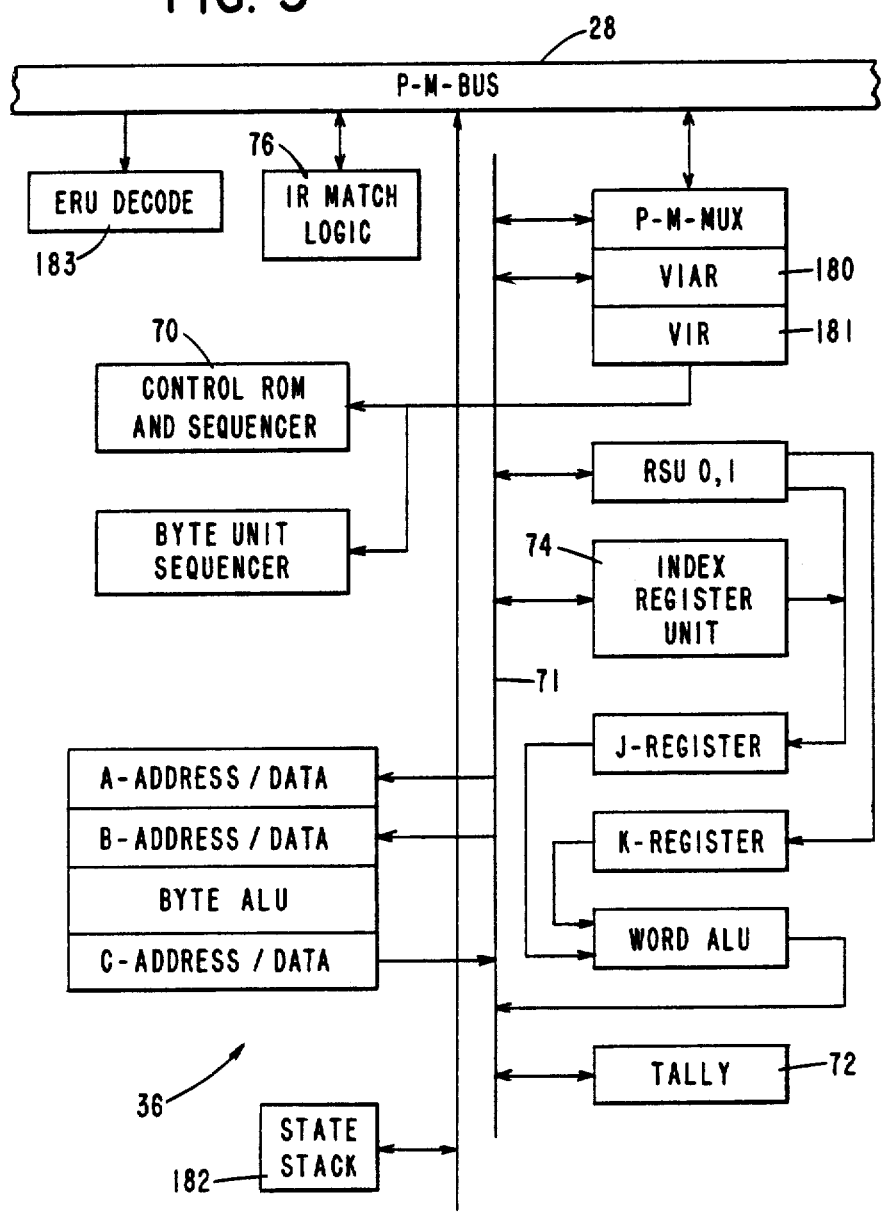
FIG. 3 is a block diagram of a NEAT assist chip of FIG. 2.

The BPSMP module 18 and the BPSMS module 20 may also contain specialized hardware enhancement chips, such as an extended arithmetic chip (EAC) 34 of FIG. 2 which provides specialized hardware for floating point arithmetic, and a NEAT assist chip (NAC) 36 which provides a self-contained firmware on-chip processor which executes a subset of NEAT commands. The NAC 36 of FIG. 2 is an NCR 9000 Series NEAT assist chip, whose block diagram is shown in FIG. 3. Without the NAC 36, the CPC 22 is the main element which subordinates activities to the ATC 24 and EAC 34. When emulating, for instance, NEAT commands, the CPC 22 interprets and executes the NEAT commands by accessing routines in the ISU memory 30. When a NAC 36 is present, the NAC becomes the master. The NEAT virtual command to be executed is then fetched from the main memory 32 of FIG. 2 by the NAC 36, a command set up is performed, and then, only if the NAC 36 does not support the execution of that particular command, is control passed to the CPC 22. When a NAC 36 is present, the CPC 22 only invokes the use of the ATC 24 or EAC 34 as requested by the NAC 36. While the NAC 36 is executing virtual NEAT commands, the CPC is available to service I/O interrupts or time-of-day interrupts concurrent to the operations being performed by the NAC 36.

Referring to FIG. 3, the NAC 36 does not use any off-chip control store. All storage needed to execute the virtual NEAT commands supported by the NAC 36, is contained in a control ROM and sequencer (ROM) 70. Microinstructions in the NAC 36 are executed within a two-stage pipeline having interpret and execute stages. In the interpret stage, whose start is indicated by the NVCSU/ signal on conductor 37 of FIG. 2, the ROM address for the beginning microinstruction to emulate the virtual NEAT command is determined, and the number of bytes affected by the virtual instructions is stored in a tally register 72. A copy of the first 15 index registers in the main memory 32 of FIG. 2 is kept in an index register unit (IRU) 74. This is done by monitoring the PM bus 28 (see FIG. 2) with index register match logic 76, which causes the storage of the contents of any of the first 15 index registers fetched or modified by appropriate instructions over the PM bus 28 to the first 15 virtual addresses of the main memory 32, to be stored in the IRU 74. Thus, during the interpret and execute stages of the NAC 36, access may be made directly to the IRU 74 in the NAC 36, without having to fetch any of the first 15 registers from the main memory 32.

In the execution stage, the ROM 70 is addressed for the beginning microinstruction of the NEAT command being emulated, and the proper index register in the IRU 74, or any other register in the NAC 36 or other device in the system attached to the PM bus 28, as may be appropriate, is accessed to execute the microinstruction. The count in the tally 72 is then decremented as each byte affected by the virtual command is processed. During execution, the contents of an index register may be modified. Any such modifications are made to the index register in main memory 32 by the NAC 36 over the PM bus 28. The index match logic 76 of FIG. 3 sees any writes to the first 15 virtual index registers, and modifies the NAC copy of the modified index register in the IRU 74 such that the index registers in the IRU 74 are always kept current. Thus, modifying any of the first fifteen index registers in the main memory 32 of FIG. 2 by the NAC 36 during emulation of a NEAT command, will also modify the copy of the modified index register in the ISU 74 of the NAC 36. Only the first fifteen index registers are kept in the IRU 74 because it has been determined that about 98% of the microinstructions of the NAC 36 utilize only those registers.

The NAC 36 also contains a virtual instruction address register (VIAR) 180 in which the address of the next virtual command to be fetched is stored, and a virtual instruction register 181 (VIR) in which is stored the virtual command last fetched by the NAC 36. The NAC 36 also contains a state stack 182, which is actually four 32-bit ERU registers, all of which are connected directly to the PM bus 28. Access to the state stack 182 is controlled by an ERU decode circuit 183 in a well known manner.

The first state stack register (SSR1), not shown, of the state stack 182 will contain one of two different words of information, depending on why the NAC 36 is passing control to the CPC 22. When control is transferred because of a non-supported command, the SSR1 of state stack 182 will contain a control transfer word, which includes the virtual Op-Code to be executed by the CPC 22 at bits 25-32, the virtual tally field defining the length of the operand at bits 17-24, and virtual indicator bits 1-8 which are set and reset by the NAC 36 during virtual command execution, as required by the command being emulated. When the NAC 36 transfers control because of a condition which it cannot handle, the SSR1 of state stack 182 will contain an exception condition word. The second register (SSR2), not shown, of the state stack 182 contains various codes and flags for the operation of the NAC 36 in the emulation of a NEAT command, including an INB flag at bit 26 which is modified by the NAC 36 during set-up, and reflects whether the NAC is in the first or second word setup of a two word NEAT command. The third register (SSR3), not shown, of the state stack 182 contains various internal indicators, a trap link register and a retry link register. The fourth register (SSR4) of the state stack 182 contains a copy (old copy) of the virtual indicators from the SSR1 as they were loaded into the SSR1 during setup time.

The processors (CPC 22 or NAC 36) of the BPSMP module 18 and the BPSMS module 20 are synchronized to execute commands in parallel, including fetching data from the main memory, and manipulating the data in accordance with instructions either from the ISU memory 30 or the control ROM 70 of the NAC, and then storing the manipulated data back in the main memory. The operations of the processors will be compared at all times, as will be explained, and upon a miscomparison, the processors will be instructed to reexecute their last virtual command until an equal comparison is obtained, or a determination is made that a hard error has occurred.

Returning to FIG. 1, a pair of writable control store modules (WCSM) 34 and 36 are provided. Each WCSM includes 8K bytes of read-only memory (ROM) which provide power-up, boot and start-of-day programs, and 64K bytes (32K words) each of random access memory (RAM) which are used for ISU memory (30 of FIG. 2). The ROM programming provides that instructions in the form of data may be fetched from the main memory of the system, and stored in the RAM devices in a WCSM load program. It will be understood that 32K words of ISU instructions will be stored in the WCSM1 module 34, and 32K words will be stored in the WCSM2 module 36. The BPSMP module 18 is connected to the WCSM modules 34 and 36 by an ISU bus 38 and an extension bus 40. The BPSMS module 20 is connected to the WCSM modules 34 and 36 by an ISU check (ISUCHK) bus 42 and 44, and to a data integrity module (DINM) 46, to be explained later, by an extension 48 of the ISUCHK bus 42.

A PM bus 50, which is the same as that explained in connection with FIG. 2, is connected between the BPSMP module 18 and the memory subsystem 14, and includes a data portion 52 for primary processor data (PBDAT) and an address portion 54 for primary processor addresses (PAD). A second PM bus 56 is connected between the BPSMS module 20 and the DINM module 46, and includes a data portion 58 for secondary processor data (SBDAT) and an address portion 60 for secondary addresses (SAD). The DINM module 46 is also connected to the PBDAT bus 52 and the PAD bus 54.

As will be explained, ISU addresses to the WCSM modules 34 and 36, and ISU instructions from the WCSM modules 34 and 36 are latched onto a latched ISU (LISU) bus 62 connected between the WCSM modules 34 and 36, and the DINM module 46. Among the functions of the DINM module 46, is the comparison of the calculated results after the manipulation of data by either the CPC 22 or the NAC 36 of both of the BPSM modules 18 and 20. If the resultants from the modules 18 and 20 are not the same, the processors (either CPC 22 or NAC 36) which were executing virtual commands are rolled back to retry the last virtual command in which the error occurred. During the retry operation, the data originally fetched in the first try of the execution is resupplied to the executing processors. A virtual command roll-back module (VCRM) 64 is provided to store all fetched data and associated error correction code (ECC) check bits from the memory subsystem 14, referred to herein as a fetch log. To accomplish this, the VCRM 64 is connected to the PBDAT bus 52, and has sufficient RAM to store 2K of fetched data entries.

As explained in connection with FIG. 3, the NAC 36 keeps its own copy of the first 15 index registers, and any fetches to be made during the emulation of a virtual command to any of these first 15 index registers will be made over an internal bus 71 (see FIG. 3) in the NAC 36 to the NAC's copy of the register in the IRU 74. Thus, it will be understood that any fetches from the first 15 index registers during a NAC virtual command emulation will not appear in the fetch log. Since the index registers may be modified during the execution of an instruction, the contents of the index register in the IRU 74 of the NAC 36 may not be the same as when the command was first tried. Thus, the VCRM 64 also contains an index register log (IR log) which contains an original copy of the first 15 index registers of the main memory 32 of FIG. 2, as those index registers appeared in the interpret stage of the NAC 36 for the current virtual command, and a second or modified copy of the first 15 index registers as they may be modified during the instruction stage. If the virtual command is successfully executed, the modified copy in the IR log becomes the original copy for the subsequent virtual command, and the original copy is used to record modifications during the execution of that subsequent command. If the virtual command execution is not successful, firmware restores the contents of the original copy of the IR log to the main memory 32, which is simultaneously stored in the IRU 74 by the IR match logic 76 of FIG. 3. The NAC 36 is then returned to its interpret stage, and the execution of the virtual command is retried. It will thus be understood that the described IR log will not be needed in the case of CPC virtual command execution because data fetched from the first 15 index registers will appear, in that case, in the data fetch log.

The VCRM 64 is also connected to the LISU bus 62 by a bus extension 75. The VCRM 64 contains a RAM for storing the ISU addresses provided by the BPSMP 18 in a trace log, which may be used by firmware for diagnostic purposes. The trace log RAM stores up to 2K of ISU address entries while trace is enabled. The trace log may also be used, if desired, for backing up the CPC pipeline.

As discussed in the aforementioned NCR/32 General Information publication, the CPC 22 of FIG. 2 uses external registers (ERUs) to, among other things, provide for communication between the 32 bit chip set devices of the processor modules 18 and 20, and for user-defined control signals to be set and monitored by the CPC 22. The other devices of the 32 bit chip set, the ATC 24, EAC 34 and NAC 36, and various modules of the system have similar ERU capabilities.

A system dependent function module (SDFM) 78 is provided which includes ERU registers (not shown) for accepting, modifying and displaying individual bits of a selected ERU by a user for the operation and control of the data processing system of FIG. 1.

The I/O subsystem 12 of FIG. 1 includes a primary I/O bus 80 having a primary I/O data (PIODAT) portion 82 and a primary address (PIOADR) portion 84. A pair of basic I/O modules (BIOM) 86 and 88 are provided, one being a primary module (BIOMP) and one being a secondary (BIOMS) module. Each BIOM module 86 and 88 includes an ATC chip, which is the same as the ATC 24 of FIG. 4, and two NCR/32-500 system interface controllers (SIC) chips, as described in U.S. Pat. No. 4,387,441, issued June 7, 1983 to Kocol et al. for "Data Processing System Wherein At Least One Subsystem Has A Local Memory and A Mailbox Memory Within The Local Memory for Storing Header Information," and which is owned by the assignee of the present invention. The BIOMS module 88 has a second I/O bus 90 having an I/O data (SIODAT) portion 91 and an I/O address (SIOADR) bus 92. A DINM module 94 (which is similar to the DINM module 46 of the processor subsection 10) is connected between the primary I/O bus 80 and the secondary I/O bus 90 for providing data integrity checks in the I/O subsystem 12. Various I/O personality modules (IOPM) 93 may be connected to the BIOMP 86 to provide selected system-to-system or peripheral interface channels of various bandwidths and using various protocols.

The main memory subsystem 14 includes a plurality of memory arrays 100, and a dual-port memory control (DMCM) 102. Each memory array 100 has a central processor path having a data portion (CPMDAT) 104 and an address portion (CPMADR) 106, and an I/O path having a data portion (IOMDAT) 108 and an address portion (IOMADR) 110. Thus, the DMCM 102 may allow one of the BPSM modules 18 or 20 to access one memory array 100, while allowing one of the BIOM modules 86 or 88 to access another memory array 100. The DMCM 102 also includes a prefetch circuit, to be discussed. The WCSM modules 34 and 36 of FIG. 1, and the VCRM module 64 are fully disclosed in a co-pending patent application Ser. No. 748,361 for "Virtual Command Rollback In A Fault Tolerant Data Processing System" filed June 24, 1985 by Corcoran et al., and which is owned by the assignee of the present invention.

Figure 4:
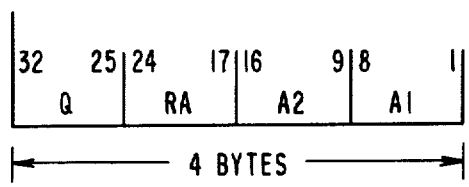
FIG. 4 is a diagrammatic illustration of a one word command such as is emulated by the NEAT assist chip of FIG. 3.
Figure 5:
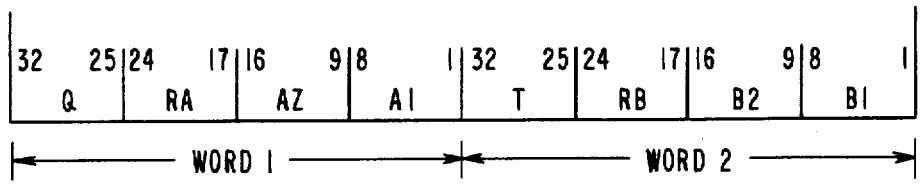
FIG. 5 is a diagrammatic illustration of a two word command such as is emulated by the NEAT assist chip of FIG. 3.

Before discussing the prefetch circuit of the DMCM module 102, a discussion of the virtual NEAT commands being emulated by the NAC chip 36 of FIG. 2 would be helpful. The NEAT language is a computer language developed by the NCR Corporation of Dayton, Ohio, and is fully explained by reference manuals from that corporation. For instance, the instructions for virtual operations are explained in the reference manual NEATVS available from NCR Corporation under stock number ST-9481-47. Programming concepts for the NEAT language under virtual operations are explained in the publication NEATVS VRX-3 available from NCR Corporation under the stock number ST-9481-46. As explained in the aforementioned NEATVS publications, NEAT object commands may be either a one-word command or a two-word command. A one-word command is shown in FIG. 4, and has a total of 32 bits arranged in four bytes with one byte for the Q field, one byte for the RA field, one byte for the A2 field, and one byte for the A1 field. In use, the A2 and A1 fields are concantenated into a single A2A1 field. The Q field contains an object instruction code that identifies the actual virtual machine object instruction to be performed. The RA field may contain an identification of an index register which, when used with the A2A1 field, is used to calculate the effective address of the A operand by adding the contents of the index register identified in the RA field to the offset represented by the A2A1 field. A two-word NEAT command is illustrated in FIG. 5 in which the first word has four bytes very much like the four bytes of FIG. 4 including a Q field, an RA field, an A2 field, and an A1 field. Word 2 of the two-word command includes a T field, an RB field, a B2 field, and a B1 field. In use, the B2 and B1 fields are concantenated into a single B2B1 field. The T field is a binary value which normally specifies the length of the A and B operands. The RB field may contain the identification of an index register for calculating the effective address of the B operand, which is calculated by adding the contents of the index register identified in the RB field with the offset of the B2B1 field. The eighth bit of the Q field of word 1 of FIG. 5 identifies whether the command is a one word (bit 8 equal to 1) or a two word (bit 8 equal to 0) command. It will thus be understood that the NAC chip 36 of FIG. 2 fetches a 32 bit, 4 byte NEAT command from memory, and evaluates the Q field (bits 25–32) of the command, and determines if a second word, adjacent to the first word, should be fetched. When the NAC 36 has the full command (either 1 word or 2 words), it looks to its own firmware to determine if it may issue microinstructions to the CPC chip 22 to emulate the NEAT command. In emulating the NEAT command contained in either a one word command of FIG. 4 or a two word command of FIG. 5, the NAC chip 36 must fetch from memory the contents of the index register fields RA and RB, if applicable, calculate the address of the A and B operands where appropriate, and fetch the data for the A operand and the B operand, where appropriate, to emulate the command.

Figure 6:
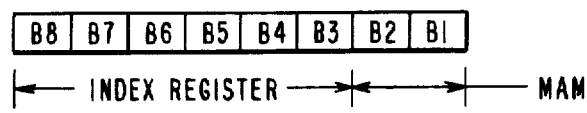
FIG. 6 is a diagrammatic illustration of the RA or RB fields of FIGS. 4 and 5.

FIG. 6 is an illustration of the RA or RB field of FIGS. 4 and 5. As shown in FIGS. 4 and 5, the RA field is located at bits 17–24 of the first word of a command, and the RB field is located at bits 17–24 of the second word of a two word command of FIG. 5. Each RA or RB field includes an index register number at bits 3–8, and a memory accessing mode code (MAM) at bits 1 and 2. For the purpose of the present invention, the memory accessing mode code may be ignored. It will be noted that when the index register number is contained in 4 bytes (not shown), that the first two bits of the RA or RB field may be forced to zeros such that the index register number then in bits 3–8 becomes the address of that index register. For instance, index register 0 is started at byte 0 of the virtual memory, index register 1 is started at byte 4, index register 2 is started at byte 8, and so forth.

Figure 7:
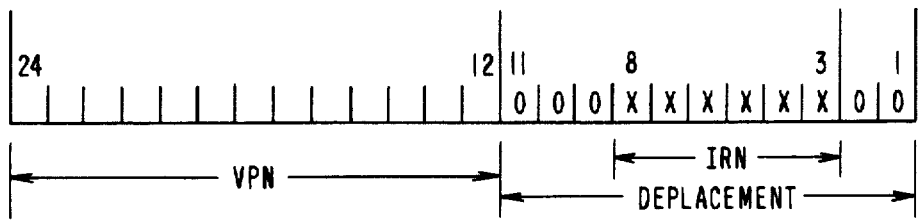
FIG. 7 is a diagrammatic illustration of a virtual address of an index register.
Figure 8:
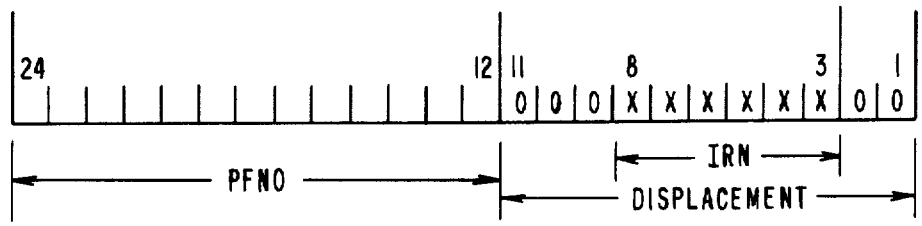
FIG. 8 is a diagrammatic illustration of a real address of an index register.

FIG. 7 illustrates the virtual address used to fetch the contents of an index register from the memory. Virtual addressing, which is well understood in the art and fully explained in the aforementioned ST-9481-46 publication and the aforementioned NCR/32 General Information publication, includes a displacement and a virtual page number (VPN). The illustrated example herein shows a 2K virtual page size. The virtual page number extends between bits 12 and 24 of the virtual address, and the displacement extends between bits 1 and 11. The displacement of an index register is made up of 0's in bits 1 and 2, as explained, and the index register number in bits 3–8. Thus, to fetch the contents of an index register whose number is in bits 3–8, the index register number is preceded by two zeros in bits 1 and 2 and concantenated with a virtual page number to make up a 24 bit virtual address which is placed on the PM bus 28 of FIG. 2. As fully explained in Section 5 of the aforementioned NCR/32 General Information publication, the address translation chip (ATC) 24 of FIG. 2 takes the virtual page number (VPN) of FIG. 7 and converts it to a page frame number (PFNO) which is concatenated with the displacement to form a real address (see FIG. 8). The ATC chip 24 then places the real address on the PM bus 28 to be used by the main memory 32 for fetching, in the illustrated example, the contents of the index register.

It will be understood that the displacement is made up of a number which, in the case of an A operand, is formed by adding the value of the A2A1 field to the contents of the index register indicated in the RA field. Where a B operand is used, the value of the B2B1 field is added to the contents of the index register indicated in the RB field. In the case of a 4K virtual page size, the virtual page number would extend from bits 13-24, shown in FIG. 7, and the page frame number of the real address would extend from bits 13-24, shown in FIG. 8.

As will be discussed in connection with FIGS. 9A and 9B, the prefetch unit 200 of the DMCM module 102 includes four buffer registers, three virtual address registers, and four real address registers. When the NAC 36 of FIG. 2 wishes to fetch either a NEAT command or data from the main memory 32, the NAC 36 places the virtual address on the PM bus 28, the ATC chip 24 takes the virtual address from the PM bus 28 and translates it into a real address, which it then places back on the PM bus 28. The instruction or data at the real address is then fetched from the main memory 32 and returned to the NAC 36. The prefetch circuit 200, also connected to the PM bus, detects a fetch from the NAC 36, places the virtual address from the PM bus in a virtual address register, and the corresponding real address in a corresponding real address register. The prefetch circuit 200 then increases or decreases the virtual address by 4, as instructed, and, if a page boundary is not crossed, increases or decreases the real address. The instruction or data at that real address is then fetched by the prefetch circuit 200 and placed in a corresponding data register to be used by the NAC 36 in a subsequent operation.

Thus, after the initial fetch is made by the NAC 36, the prefetch circuit 200 prefetches the next instruction or data such that the instruction or data is ready for use by the NAC 36 without having to be fetched. If a virtual page boundary is crossed by the increasing or decreasing of the virtual address, the increased or decreased virtual address is placed on the PM bus and the ATC chip 24 is instructed to translate the virtual address and return its real address to the prefetch circuit 200. The prefetch circuit 200 then prefetches the instruction or data at that translated address, and stores it in the proper register.

Figure 9A:
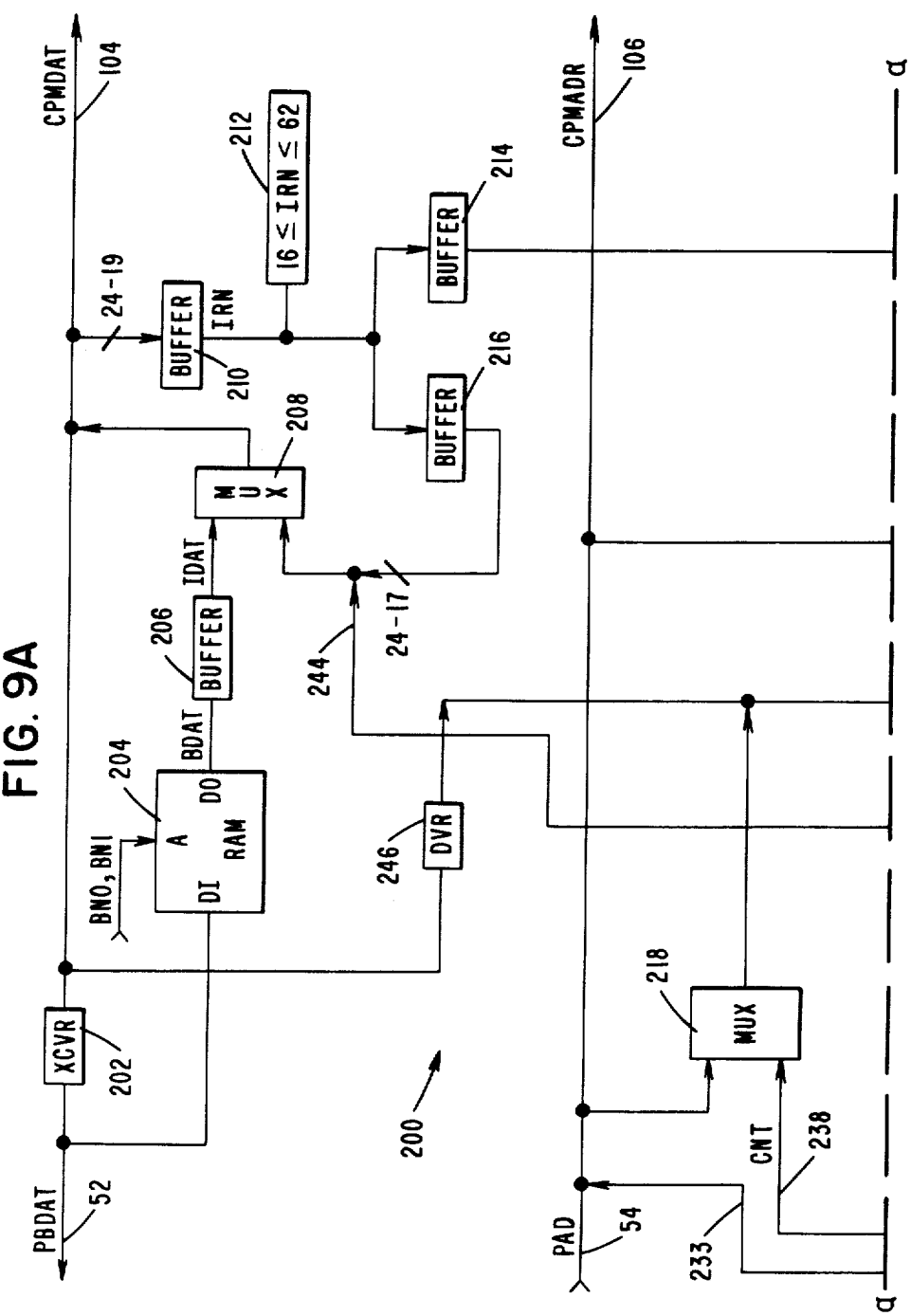
FIGS. 9A and 9B, joined along line a—a, forms a block diagram of a prefetch circuit for use with the system of FIG. 1.

If a command is prefetched by the prefetch circuit, it is stored in a command buffer at address 0 of a buffer register storage unit (RAM 204 of FIG. 9A). The buffer registers at addresses 1 and 2 of RAM 204 are reserved for data, and buffer register at address 3 of RAM 204 is reserved for the contents of an index register. As discussed in connection with FIGS. 4 and 5, a NEAT command contains the number of an index register to be used in determining the address of the A and B operands. When a command is fetched or prefetched, the index register embedded in the NEAT command is decoded by the prefetch circuit, and the contents of that index register is fetched by the prefetch circuit from the main memory 32 and placed in the buffer register at address 3 of the RAM 204 for use when needed by the NAC 36.

Figure 9B:
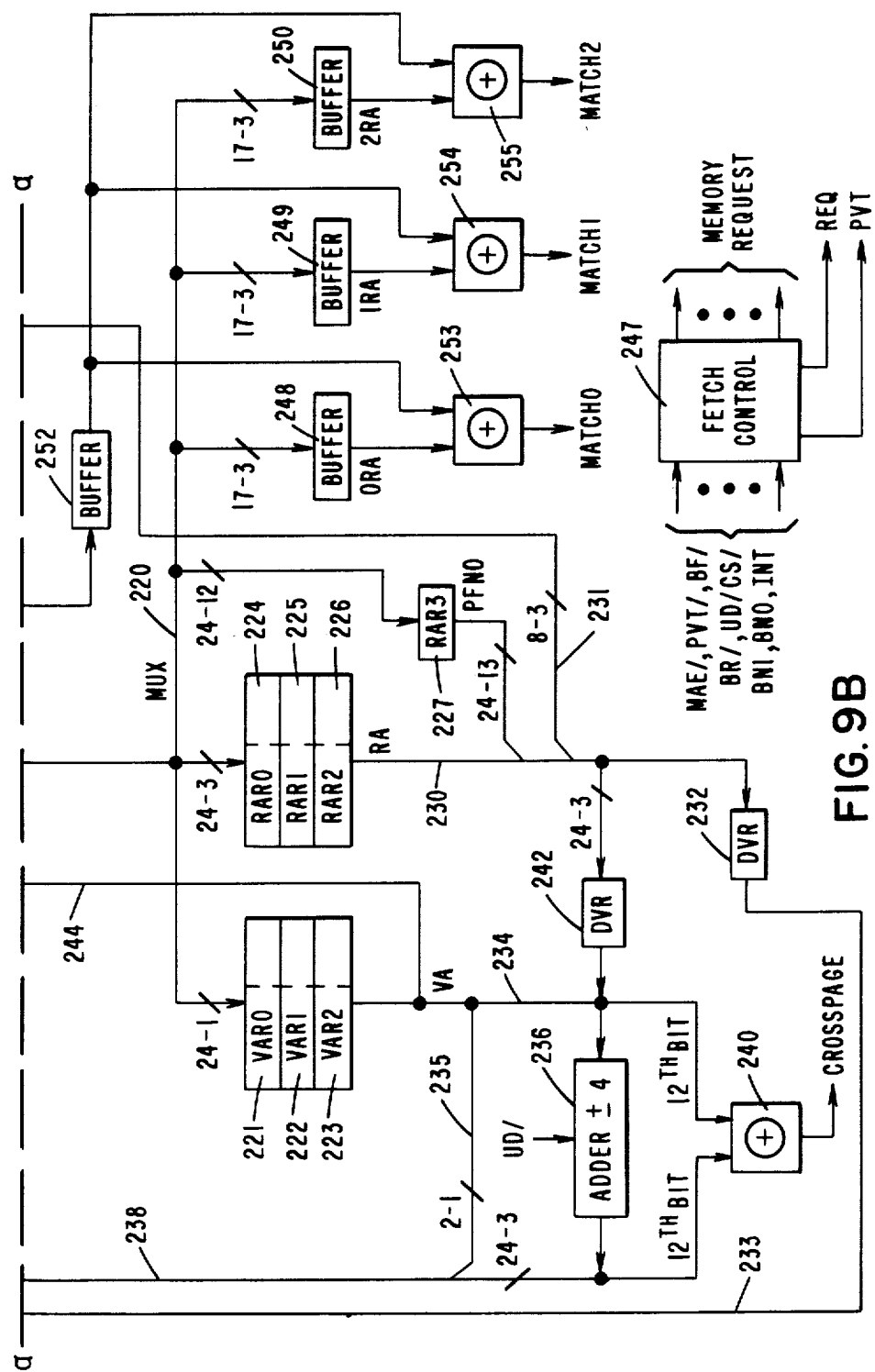

FIGS. 9A and 9B, joined along line a—a, together form a block diagram of a prefetch circuit 200 which is in the DMCM module 102 of FIG. 1. The prefetch circuit 200 is connected to the PBDAT data bus 52 and the PAD address bus 54 of the PM bus 50 of FIG. 1. A transceiver 202, which may be 74F245 devices available from Fairchild, is provided in the PBDAT data bus 52 to receive data from the data bus 52 and to assert data from the prefetch circuit 200 on the data bus 52, as appropriate. A 4×32 bit RAM 204, which may be 74LS670 devices available from Texas Instruments, is provided with its data input terminals connected to the PBDAT data bus 52. The RAM 204 is addressed at address terminal A by a pair of data signals (BN0 and BN1) which provide a binary number from 0 to 3. The data output terminals (D0) of the RAM 204 are connected to a buffer 206, which may be 74F533 devices available from Fairchild, whose output is connected to an input of a multiplexer 208. The output of the multiplexer 208, which may be 74F258 devices available from Fairchild, is connected to the PBDAT data bus 52 through transceiver 202.

A buffer 210, which may be a 74S174 device available from Texas Instruments, is provided for storing bits 19-24 of NEAT commands fetched from the memory 32 of FIG. 2 over the PBDAT data bus 52. As discussed in connection with FIG. 6, bits 19-24 contain the index register number (IRN) of either the RA field or the RB field of the NEAT command. As discussed in connection with FIG. 3, the NAC 36 includes an internal register for storing the contents of the first fifteen index registers. Therefore, if the index register number on the PBDAT bus 52 is one of the first fifteen registers, the contents of those registers will be taken by the NAC 36 from its internal registers. Also as is known, the NEAT language permits use of the first 62 index registers by a programmer. Thus, decoding logic 212 is provided for decoding the index register number to determine if the index register number is greater than or equal to 16 and less than or equal to 62. If the index register number in buffer 210 is greater than or equal to 16 and less than or equal to 62, the index register number is stored in a buffer 214, which may be a 74F240 device available from Fairchild, connected to the output of buffer 210. A buffer 216, which may be a 74F244 device available from Fairchild, is also provided and connected to the other input of multiplexer 208 for placing the contents of the index register number buffer 210 on the PBDAT data bus 52 when instructed, as will be discussed.

The PAD address bus 54 is connected to one input of a multiplexer 218, which may be 74F257 devices available from Fairchild, and whose output is connected to a MUX bus 220. Bits 1-24 of the MUX bus 220 is connected to a stack of three virtual address registers (VAR0-VAR2) 221, 222 and 223, each of which may be 74F374 devices available from Fairchild. Bits 3-24 of the MUX bus 220 are connected to a stack of three real address registers (RAR0-RAR2) 224, 225 and 226, each of which may be 74F374 devices available from Fairchild. Bits 12-24 of the MUX bus 220 are connected to real address register RAR3 227, which may be made up of 74F374 devices available from Fairchild. The VAR0 register 221 is reserved for storing the virtual address of a NEAT command, and the RAR0 register 224 is reserved for storing its corresponding real address. VAR1 register 222 and VAR2 register 223 are reserved for storing the virtual addresses of data, and RAR1 register 225 and RAR2 register 226 are reserved for storing their corresponding real addresses. As discussed in connection with FIG. 8, bits 12-24 of the real address represents the page frame number, which, when used with the displacement, forms the real address. The outputs of the real address registers RAR0 224 through RAR3 227, are connected to a real address (RA) bus 230. The output of the buffer 214, which contains the index register number, is also connected to the RA bus 230 over bus 231. A driver 232, which may be 74F244 devices available from Fairchild, has its input connected to the RA bus 230 and its output connected to the PAD data bus 54 over bus 233. Thus, real addresses from the real address registers RAR0-RAR3 may be asserted on the PAD data bus 54 and connected CPMADR bus 106 (see FIG. 9A) by driver 232 for making fetches from one of the memory arrays 100 of the memory subsystem 14 of FIG. 1. It will be noted that the contents of buffer 214, when concantenated with the contents of the RAR3 register 227, forms the real address for the index register which was received in the NEAT command fetched from memory over the CPMDAT bus 104 connected to the PBDAT data bus 52 (see FIG. 9A).

The output of the virtual address registers VAR0-VAR2 (221, 222 and 223 respectively) are connected to a virtual address (VA) bus 234 which is connected to the input of an adder 236, which may be 74F191 devices available from Fairchild. The output of the adder 236 is connected to a count (CNT) bus 238 which is connected to the other input of the multiplexer 218. The twelfth bit of the VA bus 234 is connected to one input of a comparator 240, and the twelfth bit of the CNT bus 238 is connected to the other input of the comparator 240. When the increase or decrease of the virtual address on VA bus 234 by the adder 236 causes the twelfth bit of the virtual address to change, the comparator 240 outputs a CROSSPAGE signal which indicates that a page boundary has been crossed. The twelfth bit is selected in the present example for a 2K virtual page size. The thirteenth bit is used if a 4K virtual page size were used. A driver 242, which may be made up of 74F244 devices available from Fairchild, is provided for transmitting real addresses on the RA bus 230 to the VA bus 234. A bus 244 connects the VA bus 234 with the second input of the multiplexer 208.

A driver 246, which may be 74F244 devices available from Fairchild, has its input connected to the PBDAT data bus 52 and its output connected to the MUX bus 220 such that data from the PBDAT data bus 52 may be placed directly on the MUX bus 220 for placement in any of the registers 221 through 227. A 0RA buffer 248, a 1RA buffer 249, and a 2RA buffer 250, all of which may be 74F373 devices available from Fairchild, have their inputs connected to the MUX bus 220. The 0RA buffer is loaded at the same time as the RAR0 buffer 224, the 1RA buffer 249 is loaded at the same time as the RAR1 buffer 225, and the 2RA buffer 250 is loaded at the same time as the RAR2 buffer 226. A buffer 252, which may be 74373 devices available from Fairchild, has its input connected to the PAD address buffer 54, and its output connected to comparators 253, 254 and 255. The output of 0RA buffer 248 is connected to the other input of the comparator 253, the output of the 1RA buffer 249 is connected to the other input of the comparator circuit 254, and the output of the 2RA buffer 250 is connected to the other input of the comparator 255. Each of the comparators 253, 254 and 255, may be made up of 74521 devices available from Fairchild. The output of the comparator 253 provides a MATCH0 signal, the output of comparator 254 provides a MATCH1 signal, and the output of comparator 255 provides a MATCH2 signal. The match signals MATCH0, MATCH1 and MATCH2 are used to invalidate buffer entries in the RAM 204 in the event the addressed location for a buffer entry is changed in memory by a store. It will be understood that this prevents a buffer entry in the RAM 204 from being supplied to the NAC 36, if that buffer entry has been modified subsequent to the time it was prefetched.

Fetch logic 247 is provided to control the operation of the prefetch circuit 200 which will now be described. The fetch control logic circuit 247 receives the following signals:

MAE/ (Memory Address Enable)

This signal is generated by the NAC 36 during $X_0$ to enable the transfer of a real memory address over the PM bus.

PVT/ (Processor Virtual Transfer)

This signal is generated by the NAC 36 during $X_0$ to enable the transfer of a virtual memory address.

BF/ (Buffer Fetch)

This signal is sent by the NAC 36 to indicate that a fetch is being requested.

BR/ (Buffer Request)

This signal is sent by the NAC 36 to indicate that the NAC 36 wishes to receive either an instruction or data.

UD/CS/ (Up-Down/Continue-Stop)

This signal is used to indicate either that the following requests are to be located adjacent to the present fetch either at a higher address (up) or at a lower address (down), or that additional receives are to be continued or stopped. This signal is thus used to indicate different things depending upon which signal it is received with. When a BF/ signal is used, the UD/CS/ signal is an up-down signal. When it is received with a BR/ signal, it is a continue-stop signal.

BN1, BN0 (Buffer Number 1, Buffer Number 0)

These two signals, when taken together, form a binary value of from 0 to 3 to indicate which of the buffer registers is being addressed by the fetch or receive signals from the NAC.

INT (Interrupt)

This signal is generated to indicate that an interrupt condition has occurred. Upon receipt of this signal, the fetch control logic 247 is conditioned to receive new data from the PBDAT data bus 52 to reload the various address registers to restart the prefetch operation when the interrupt signal is removed.

When the NAC 36 is ready to fetch, for instance, a NEAT command from the main memory, a BF/ signal is asserted indicating that a fetch is to occur. The BN1 and BN0 signals form a binary 0 to indicate that an instruction is being fetched. Also, the UD/CS/ signal is set to indicate whether the next instruction to be prefetched by the prefetch circuit 200, is to have a higher or a lower address. The fetch control circuit 247 then watches for a PVT/ signal to indicate that a virtual address is being transferred over the bus. The fetch control logic 247 then sets the multiplexer 218 to place the virtual address on the PAD address bus 54 into the VAR0 register 221. The fetch control logic 247 then watches for a MAE/ signal to indicate that a real address is being placed on the PM bus. The real address is then multiplexed through multiplexer 218 from the PAD address bus 54 into the RAR0 register 224. The NAC 36 then fetches the requested command from the main memory and starts the emulation of the fetched command while the prefetch circuit 200 prepares to prefetch the next command adjacent to the presently-fetched command. The virtual address in VAR0 register 221 is presented over VA bus 234 to the counter 236 which is conditioned by the UD/ portion of the UD/CS/ signal such that it counts either up or down. Bits 1 and 2 from the VA bus 234 are bypassed around the counter over a bus 235 directly to the CNT bus 238. The value of "1" is added to bits 3-24 of the virtual address on VA bus 234, which in effect adds four to the virtual address. The twelfth bit of the virtual address on VA bus 234 is compared to the twelfth bit on the CNT bus 238 to determine if a virtual page boundary has been crossed. If a page boundary has not been crossed, the new virtual address is restored through the multiplexer 218 into the VAR0 register 221. The real address, contained in the RAR0 register 224, is placed on the RA bus 230 and transferred from the RA bus 230 through driver 242 to the VA bus 234. Adder 236 then adds 4 to the real address, and the new real address is stored back into the RAR0 register 224 through multiplexer 218. The new real address is then placed on the RA bus 230 and asserted through driver 232 over bus 233 onto the CPMADR bus 106 (see FIG. 9A). The new real address, along with memory request signals from the fetch control logic circuit 247, fetches the next command from the main memory. When the thus prefetched next command is returned over the CPMDAT bus 104 to the transceiver 202, the transceiver 202 asserts the fetched instruction on the PBDAT bus 52, which is loaded into the RAM 204 at address 0, as determined by the BN0 and BN1 signals on the address terminal of the RAM 204.

When the NAC 36 needs the next NEAT command from memory, it sends a BR/ receive signal to the fetch control circuit 247. The receipt of a BR/ signal, instead of a BF/ signal, instructs the fetch control logic 247 to send the contents of the RAM 204 at the address designated by the BN0, BN1 signals back to the NAC 36. The UD/CS/ signal now indicates whether the prefetch circuit 200 is to continue to prefetch commands, or to stop. This same procedure is followed when data is fetched from the main memory by using the VAR1 register 222 and its associated RAR1 register 225, or the VAR2 register 223 and its associated RAR2 register 226.

In the event that a page boundary is crossed, the CROSSPAGE signal from the comparator 240 goes active. The new virtual address on the CNT bus 238 is stored in the proper VAR0-VAR2 register 221-223 through the multiplexer 218, and placed on the VA bus 234. The fetch control logic 247 then requests the PM bus 28 of FIG. 2 by issuing a proper request (REQ) signal (see FIG. 9B). When the request is granted by the PM bus 28, the virtual address on the VA bus 234 is then driven over bus 244 through the multiplexer 208, and through the transceiver 202 to be placed on the PBDAT bus 52. The fetch control circuit 247 also generates a signal PVT, which instructs the ATC 24 of FIG. 2 to translate the virtual address on the PM bus 28. Instructions for the ATC chip 24 and the PM bus 28 are well understood in the art and explained in the aforementioned NCR/32 General Information publication.

After the ATC chip 24 translates the virtual address, it places the translated real address on the PAD address bus 54 with an MAE/ signal. When the prefetch circuit 200 receives the MAE/ signal, the real address is stored in the proper real address register RAR0-RAR2, 224-226, and the command or data at that real address is fetched from the memory over the CPMDAT bus 104 and stored in the proper data register of the RAM 204. The RAR3 register 227 and the 0RA-2RA buffers 248-250 are also loaded from the MUX bus 220, as previously explained, when the real address is received from the ATC chip 24.

In case there is an interrupt, such as, for instance, in the case of a roll back operation, an INT signal is received by the prefetch circuit of FIGS. 9A and 9B. The INT signal conditions the driver 246 such that data on the PBDAT bus 52 may be placed directly on the MUX bus 220. Then, after an interrupt, the CPC 22 of FIG. 2 may load addresses in the virtual address registers VAR0-VAR2, 221-223, as desired. The virtual addresses in address registers VAR0-VAR2, 221-223, may then be translated, and a command, data or the contents of an index register, as desired, may be prefetched.

An ERU register (not shown) may also be provided which, when instructed to do so may cause the contents of any of the address registers 221-227 to be placed on the bus 244 to be multiplexed through multiplexer 208 onto the PBDAT bus 52 through the transceiver 202. The contents of the IRN buffer 210, which is also stored in buffer 216, may also be multiplexed through the multiplexer 208 onto the PBDAT bus 52 through the transceiver 202. In this way the contents of any of the address buffers 221-227, or the contents of buffer 216 may be examined and displayed, as may be desired.

Figure 10:
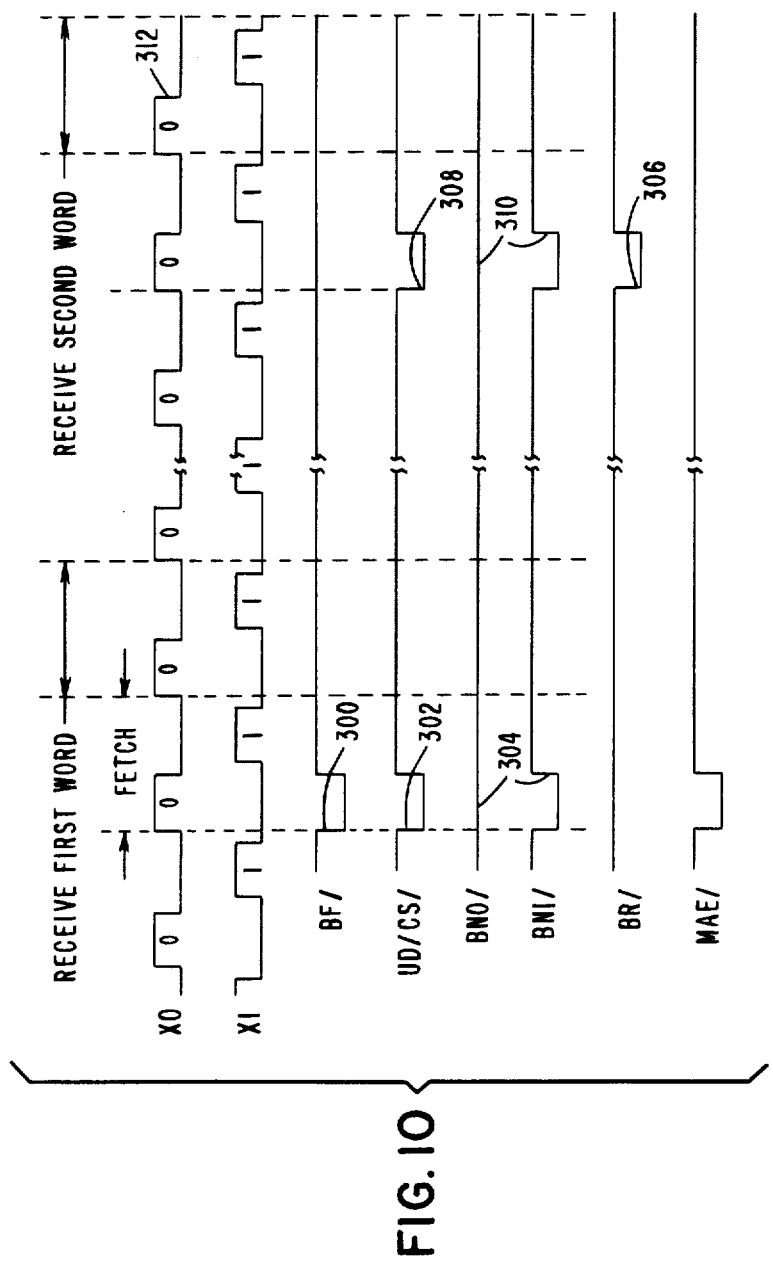
FIG. 10 is a timing diagram of various signals during a fetch-receive operation of the prefetch circuit of FIGS. 9A and 9B.

FIG. 10 is a timing diagram for the X0, X1, BF/, UD/CS/, BN0/, BN1/, BR/ and MAE/ signals during a fetch-receive operation of the prefetch circuit 200 of FIGS. 9A and 9B. At 300, the BF/ signal goes low indicating a fetch is to occur. The UD/CS/ signal goes low at 302 indicating that the direction is up. The value of BN0 and BN1 at 304 is "1" indicating that buffer one is selected. The fetch procedure is then engaged in by the NAC 36 of FIG. 2 to receive the first word. This is a several cycle procedure. After the fetch by the NAC 36, when the prefetch circuit 200 of FIGS. 9A and 9B obtains the PM bus, the prefetch circuit 200 fetches the next higher word in memory and stores it in buffer one of the RAM 204, as previously explained. At 306, the BR/ signal goes low indicating the NAC 36 desires to receive. The UD/CS/ goes down at 308 indicating that the prefetch circuit 200 is to continue to prefetch, and the BN0, BN1 address at 310 is still "1". At the next X0 at 312, the NAC 36 receives the second word from buffer one of RAM 204, and the prefetch circuit 200 prefetches the next higher word.

FIG. 11 is a timing diagram of the X0, X1, BR/, UD/CS/, BN0/ and BN1/ signals during a series of consecutive receive operations. At 314, the BR/ signal goes low, indicating the NAC 36 is to receive word A from buffer one, as indicated at 316 by BN0 and BN1, and that the prefetch circuit 200 is to continue, as indicated by the low at 318 of the UD/CS/ signal. At the next X0 at 320, the NAC 36 receives word A which was requested by the BR/ pulse 314.

A new receive for word B is started at 322, from buffer 2 of RAM 204 as designated at 324, and the prefetch circuit is to stop prefetching data for buffer 2, as designated at 326. In the illustrated example of FIG. 11, word B requested at 322 is not received by the NAC 36 until X0 328, as the prefetch unit was waiting for the requested data to be loaded into buffer 2 of RAM 204. At 330, a third receive for word C is requested from buffer 0, as designated at 332, and the prefetch circuit 200 is to continue prefetching for buffer 0, as designated at 334. At X0 336, the NAC 36 receives word C requested at 330.

The timing and generation of the memory request signals from the fetch control logic circuit 247 of FIG. 9B are not shown, as such memory request signals are well known in the art, and are explained in the aforementioned NCR/32 General Information publication.

It will be understood that a prefetch circuit could be designed with only one data buffer, one virtual address register, and one real address register to perform the described prefetch function, and that the distinction between a command and a data fetch or receive could be designated by a one bit signal, instead of providing for separate command and data buffers.

Thus, a prefetch circuit has been described which provides the aforementioned objects. It will be understood by those skilled in the art that the disclosed embodiment is exemplary only, and that the various elements disclosed may be replaced by equivalents without departing from the invention hereof, which equivalents are intended to be covered by the appended claims.

What is claimed is:

1. A prefetch circuit for fetching prefetch commands from a memory which includes registers arranged in pages having page frame numbers, said prefetech circuit comprising:

real address storage means for storing the real address of a first register which is located in said memory, said real address containing a page frame number;

virtual address storage means for storing the virtual address of said first register which is located in said memory, said virtual address containing a virtual page number;

adder means having an input and an output, said adder means for adding an offset to an address on its input;

virtual address bus means connected between said virtual address storage means and the input of said adder means, said virtual address bus means for transmitting said virtual address to the input of said adder means to obtain a new virtual address having a new virtual page number contained therein;

comparator means connected to said real address storage means and the output of said adder means, said comparator means including an output having a first state when a least significant portion of the page frame number contained in said real address is the same as a least significant portion of the new virtual page number contained in said new virtual address, and a second state when the least significant portion of the page frame number contained in said real address is not the same as the least significant portion of the new virtual page number contained in said new virtual address;

real address bus means connected between said real address storage means and the input of said adder means, said real address bus means for transmitting said real address to said adder means to obtain a prefetch real address when the output of said comparator means is in its first state; and fetch means connected between the output of said adder means and the memory for fetching a prefetch command from a second register in the memory at the location indicated by said prefetch real address.

2. The prefetch circuit of claim 1 wherein said fetch means comprises:

multiplexer bus means connected to the output of said adder means, said virtual address storage means and said real address storage means, said multiplexer bus for transmitting said new virtual address to said virtual storage means and said prefetch real address to said real address storage means; and memory address bus means connected between said real address bus means and the memory for transmitting to the memory, said prefetch real address stored in said real address storage means via said memory address bus means.

3. The prefetch circuit of claim 2 further comprising translating means connected to said memory address bus means for translating said new virtual address to a translated real address when said output of said comparator means is in its second state;

and said fetch means is further connected to said translating means for prefetching a command from the memory at said translated real address.

4. The prefetch circuit of claim 1 wherein said adder means includes means for adding either a positive or a negative offset.

5. A method for fetching prefetch commands from a memory which includes storage registers arranged in pages having page frame numbers, said method comprising the steps of:

storing in a real address storage register, the real address of a first storage register which is located in said memory, said real address having a page frame number contained therein;

storing in a virtual address storage register, the virtual address of said first register which is located in said memory, said virtual address having a virtual page number contained therein;

adding an offset to said virtual address to obtain a new virtual address having a new virtual page number contained therein;

comparing a least significant portion of said page frame number contained in said real address to a least significant portion of said new virtual page number contained in said new virtual address;

adding said offset to said real address to obtain a prefetch real address when said comparison indicates that said least significant portion of said page frame number is the same as said least significant portion of said new virtual page number; and fetching a prefetch command from a second register at the location in said memory indicated by said prefetch real address.

6. The method of claim 5 wherein said fetching step comprises:

storing said new virtual address in said virtual address storage for a subsequent prefetch operation; and storing said prefetch real address in said real address storage register for said subsequent prefetch operation.

7. The method of claim 6 further comprising adding either a positive or a negative offset to said virtual address and said real address in said adding steps.

8. The method of claim 5 further comprising translating said new virtual address to a translated real address when said least significant portion of said page frame number contained in said real address is not the same as said least significant portion of said new virtual page number in said new virtual address; and fetching said prefetched command from said memory at said translated real address.

9. In a data processing system having a memory including storage registers arranged in pages having page frame numbers, a processor for fetching commands and data from said memory, a processor data bus between said processor and said memory for transmitting commands and data therebetween, a processor address bus between said processor and said memory for transmitting addresses therebetween, and an address translating means connected to said processor address bus and said processor data bus for translating virtual addresses from said processor to real addresses, said real addresses for fetching commands and data from said memory, each of said virtual addresses having a virtual page number contained therein, and each of said real addresses having a page frame number contained therein, a prefetch circuit comprising:

a command virtual address register having an input and an output, said command virtual address register for storing the virtual address indicating the virtual location of a first storage register in said memory;

a command real address register having an input and an output, said command real address register for storing the real address indicating the real location of said first storage register in said memory;

a data virtual address register having an input and an output, said data virtual address register for storing the virtual address indicating the virtual location of a second storage register in said memory;

a data real address register having an input and an output, said data real address register for storing the real address indicating the real location of said second storage register in said memory;

virtual address bus means connected to the outputs of said command virtual address register and said data virtual address register;

real address bus means connected to the outputs of said command real address register and said data real address register;

adder means having an input connected to said virtual address bus means and said real address bus means and an output, said adder means for adding a set increment to the addresses inputted into its input to form an incremented address on its output;

multiplexer means having a first input connected to said processor address bus, a second input connected to the output of said adder means, and an output connected to the input of said command virtual address register, the input of said command real address register, the input of said data virtual address register and the input of said data real address register, said multiplexer means for multiplexing one of either an address from said processor address bus or an incremented address from said adder means to said multiplexer means output;

bypass bus means connected between said real address bus and said processor address bus for transmitting a real address stored in either of said command real address register or said data real address register to said processor address bus;

fetch means for fetching over said processor data bus, the contents of a second storage register at the location in said memory indicated by the real address transmitted over said bypass bus;

a command buffer connected to said processor data bus for storing commands fetched from said memory; and a data buffer connected to said processor data bus for storing data fetched from said memory.

10. The prefetch circuit of claim 9 further comprising:

comparison means connected between the input of said adder means and the output of said adder means, said comparison means having an output which has a first state when a least significant portion of the virtual page number of the incremented address from said virtual bus is the same as a least significant portion of the page frame number of the address from said real address bus; and bus extendsion means connected between said virtual address bus and said data bus for transmitting said incremented address from said virtual address bus to said data bus for translation by translation means when the output of said comparision means is in its second state.

11. The prefetch circuit of claim 10 wherein said adder means includes means to make said increment either positive or negative.

12. The prefetch circuit of claim 10 wherein the command stored in said command buffer contains an index register number therein, said prefetch circuit further comprising:

decoding means connected to said command buffer for decoding commands fetched from said memory to obtain the index register number contained therein;

page frame register means connected to said multiplexer means for storing the page frame number contained in the incremented real address multiplexed by said multiplexing means; and concatenating means connected to said decoding means, said page frame register means and said bypass bus means, said convatenating means for concatenating said page frame number and said index register number thereby forming an index register real address to be transmitted over said bypass bus to said processor address bus for fetching data contained in a third storage register at the location in said memory indicated by said index register address.

* * * * *

UNITED STATES PATENT AND TRADEMARK OFFICE
CERTIFICATE OF CORRECTION

PATENT NO. : 4,722,047
DATED : January 26, 1988
INVENTOR(S) : Kasun K. Chan et al.

It is certified that error appears in the above—identified patent and that said Letters Patent is hereby corrected as shown below:

Column 17, line 37, after the word "address", insert --register--.

Column 18, line 27, delete "extendsion" and substitute --extension--.

Column 18, line 51, delete "convatenating" and substitute --concatenating--.

Signed and Sealed this

Fourteenth Day of February, 1989

Attest:

DONALD J. QUIGG

*Attesting Officer*      *Commissioner of Patents and Trademarks*